US011970185B2

(12) United States Patent
Nichols

(10) Patent No.: US 11,970,185 B2
(45) Date of Patent: Apr. 30, 2024

(54) DATA STRUCTURE FOR STORING INFORMATION RELATING TO AN ENVIRONMENT OF AN AUTONOMOUS VEHICLE AND METHODS OF USE THEREOF

(71) Applicant: FORD GLOBAL TECHNOLOGIES, LLC, Dearborn, MI (US)

(72) Inventor: Gregory Boyd Nichols, Franklin Park, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 17/491,604

(22) Filed: Oct. 1, 2021

(65) Prior Publication Data

US 2023/0105871 A1   Apr. 6, 2023

(51) Int. Cl.
*B60W 60/00* (2020.01)
*B60W 50/00* (2006.01)
(Continued)

(52) U.S. Cl.
CPC .......... *B60W 60/001* (2020.02); *B60W 50/00* (2013.01); *G06F 16/9027* (2019.01); *G06F 16/90335* (2019.01)

(58) Field of Classification Search
CPC . B60W 60/001; B60W 50/00; G06F 16/9027; G06F 16/90335; G01C 21/3826;
(Continued)

(56) References Cited

U.S. PATENT DOCUMENTS 5,953,722 A * 9/1999 Lampert .......... G08G 1/096827
                                                    701/461
5,968,109 A * 10/1999 Israni ...................... G06F 16/29
                                                    707/999.102
(Continued)

FOREIGN PATENT DOCUMENTS

EP        0838663 B1    10/2003

OTHER PUBLICATIONS

Rashid Abdulmuttalib Turky et al., "Path planning with obstacle avoidance based on visibility binary tree algorithm", Robotics and Autonomous Systems, vol. 61, No. 12, Nov. 30, 2013, pp. 1440-1449. (Year: 2013).*

(Continued)

*Primary Examiner* — Peter D Nolan
*Assistant Examiner* — Peter Y Ning
(74) *Attorney, Agent, or Firm* — Frank A. MacKenzie; Brooks Kushman, P.C.

(57) ABSTRACT

Methods and systems for determining information about an area that includes a polygon for controlling navigation of an autonomous vehicle are disclosed. The methods include defining a bounding box that encloses the area, and generating a KD-tree from the bounding box that partitions the polygon into a plurality of leaf nodes that each include at least some of a plurality of edges of the polygon. The methods also include assigning a reference point to each leaf node, creating a data representation of the area that comprises the KD-tree, and adding the data representation to map data comprising the area. A reference point is associated with a location within that leaf node, and information relating to whether the reference point lies outside or inside the at least one polygon.

16 Claims, 12 Drawing Sheets

(51) Int. Cl.
*G06F 16/901* (2019.01)
*G06F 16/903* (2019.01)

(58) Field of Classification Search
CPC ............ G01C 21/3804; G01C 21/3815; G01C 21/387; G06T 17/005
See application file for complete search history.

(56) References Cited

U.S. PATENT DOCUMENTS

| | | | |
|---|---|---|---|
| 9,058,347 B2 | 6/2015 | Chandrasekhar | |
| 10,003,946 B2 | 6/2018 | Kannan et al. | |
| 10,713,795 B2 | 7/2020 | Konstantinov | |
| 2008/0049016 A1* | 2/2008 | Shearer | G06T 17/005 345/421 |
| 2008/0074416 A1* | 3/2008 | Brown | G06T 1/60 345/420 |
| 2010/0082704 A1* | 4/2010 | Zhou | G06F 16/9027 707/E17.044 |
| 2013/0235050 A1* | 9/2013 | Karras | G06T 1/20 345/505 |
| 2013/0328876 A1* | 12/2013 | Keely | G06T 17/005 345/426 |
| 2014/0023282 A1* | 1/2014 | Keller | G06T 15/06 382/225 |
| 2017/0249781 A1* | 8/2017 | Wald | G06T 17/005 |
| 2018/0137653 A1* | 5/2018 | Hemmer | G06T 9/40 |
| 2020/0050965 A1* | 2/2020 | Harvill | G06N 5/04 |
| 2020/0393268 A1* | 12/2020 | Schroeter | G01C 21/387 |
| 2022/0404506 A1* | 12/2022 | Hu | G01S 7/4972 |
| 2023/0050706 A1* | 2/2023 | LeVasseur | B60W 40/02 |

OTHER PUBLICATIONS

Loecher, M. et al., RapidPolygonLookup: An R package for polygon lookup using kd trees, available at https://cran.r-project.org/web/packages/RapidPolygonLookup/vignettes/RapidPolygonLookup.pdf.

Agafonkin, V., A dive into spatial search algorithms, Apr. 27, 2017, available at https://blog.mapbox.com/a-dive-into-spatial-search-algorithms-ebd0c5e39d2a.

Haran, I. et al., An Experimental Study of Point Location in General Planar Arrangements, available at https://dl.acm.org/doi/pdf/10.5555/2791171.2791173.

Halton, J.H., On the efficiency of certain quasi-random sequences of points in evaluating multi-dimensional integrals, Numerische Mathematik, 1960, vol. 2, p. 84-90, available at https://gdz.sub.uni-goettingen.de/id/PPN362160546_0002?tify=%7B%22view%22:%22info%22,%22pages%22:%5B88%5D%7D.

Press, William H. et al., Numerical Recipes in Fortran 77: The Art of Scientific Computing, 2nd edition, vol. 1 of Fortran Numerical Recipes, p. 300, available at https://websites.pmc.ucsc.edu/~fnimmo/eart290c_17/NumericalRecipesinF77.pdf.

Foley, T. et al., KD-Tree Acceleration Structures for a GPU Raytracer, Graphics Hardware, 2005, available at https://graphics.stanford.edu/papers/gpu_kdtree/kdtree.pdf.

Rashid Abdul Muttalib Turky et al., "Path planning with obstacle avoidance based on visibility binary tree algorithm", Robotics and Autonomous Systems, vol. 61, No. 12, Nov. 30, 2013, pp. 1440-1449.

European Search Report and Opinion in corresponding European patent application No. EP22198854.6, dated Mar. 1, 2023, 9 pages.

* cited by examiner

DATA STRUCTURE FOR STORING INFORMATION RELATING TO AN ENVIRONMENT OF AN AUTONOMOUS VEHICLE AND METHODS OF USE THEREOF

BACKGROUND

An autonomous vehicle navigating a roadway may need to keep track of and predict what other objects in the vehicle's environment ("actors"), such as other vehicles, bikes, pedestrians, animals, etc., are going to do. An autonomous vehicle may then navigate by accurately predicting the trajectory of actors based on combining detailed map information and contextual information of other objects.

For predicting the trajectory of actors, the autonomous vehicle may also identify a drivable area from the detailed map information. Drivable area for autonomous vehicles is a simplified representation of a real driving environment that includes areas in which vehicles are reasonably expected to be able to drive (e.g., streets, lanes, parking areas, etc.). Identification of drivable areas helps facilitate driving decision processes such as by delineating areas such as sidewalks, buildings, etc. While using a drivable area, the autonomous vehicle needs to make decisions such as finding the nearest point on a drivable area boundary, finding whether a given point is within a drivable area, etc. For example, if the autonomous vehicle detects an object within a drivable area, it may predict the object's trajectory to a point nearest to the object on the drivable area boundary. Similarly, while receiving sensor scans, the autonomous vehicle may need to identify whether the scan is from a point within the drivable area or outside it.

However, drivable areas can be very large and complex (composed of hundreds of polygons, each with hundreds of irregular edges), making such decisions computationally expensive and slow. Processing power and processing speed can be critical when large numbers of points are being processed, and when timely decisions need to be made based on the output. Using different data structures for different types of decisions is not feasible because of extensive memory requirements. The problem is exacerbated when map elements that are on different physical levels need to be analyzed requiring the autonomous vehicle to differentiate drivable areas on one level from drivable areas on another.

This document describes methods and systems that are directed to addressing the problems described above, and/or other issues.

SUMMARY

The present disclosure concerns implementing systems and methods for determining information about an area for controlling navigation of an autonomous vehicle. The methods may include defining a bounding box that encloses an area that includes at least one polygon, and generating a KD-tree that partitions the at least one polygon into a plurality of leaf nodes from the bounding box, where the KD-tree partitions the at least one polygon into a plurality of leaf nodes each node including at least some of a plurality of edges of the at least one polygon. The methods further include assigning a reference point to each of the plurality of leaf nodes, creating a data representation of the area that comprises the KD-tree, and adding the data representation to map data comprising the area. Each reference point may be associated with a location within a leaf node, and information relating to whether the reference point lies outside or inside the at least one polygon. Optionally, the data representation may be used for identifying the location of a query point with respect to the area, and using the location of the query point to control navigation of the autonomous vehicle for traversing the area.

In one or more implementations, identifying the location of the query point with respect to the area may include determining that the query point lies inside the at least one polygon when the reference point lies inside the at least one polygon and a count is even and/or the reference point lies outside the at least one polygon and the count is odd. Additionally and/or alternatively, identifying the location of the query point with respect to the area may include determining that the query point lies outside the at least one polygon when the reference point lies inside the at least one polygon and the count is odd and/or the reference point lies outside the at least one polygon and the count is even. The count is indicative of a number of edges of the at least one polygon that a line segment that joins the query point and the reference point intersects.

Optionally, the KD-tree may also include a plurality of partition nodes that divide the bounding box or a previously identified partition node into two regions that each include an equal number of geometrical constructs of the at least one polygon.

In certain implementation, a leaf node of the plurality of leaf nodes may include segments from two polygons included in the area. In such example implementations, the method may also include generating the KD-tree by generating a first sub-leaf node and a second sub-leaf node corresponding to the leaf node such that the second sub-leaf node and the first leaf node share a reference point location within the leaf node but differ in information relating to whether that reference point lies outside or inside a polygon. Optionally, the first sub-leaf node may include a first segment corresponding to one of the two polygons and a second segment corresponding to a remaining portion of the leaf node, and the second sub-leaf node may include a third segment corresponding to the other one of the two polygons and a fourth segment corresponding to a remaining portion of the leaf node.

In various implementations, assigning the reference point to each of the plurality of leaf nodes may include assigning the reference point as a point that lies at a geometrical center of each of the plurality of leaf nodes. Optionally, a location of the reference point may be updated when the point that lies at the geometrical center of the leaf node lies within a threshold distance of an edge of the at least one polygon. For example, the location of the reference point may be updated by using a Halton sequence for identifying the location, and storing an index for regenerating the Halton sequence in a split value location of the leaf node.

In certain implementations, the methods may also include storing a flag in the KD-tree in association with each of the plurality of edges of the at least one polygon. Such a flag is indicative of whether that edge should be ignored while determining the location of the query point with respect to the area.

The implementing systems can comprise: a processor; and a non-transitory computer-readable storage medium comprising programming instructions that are configured to cause the processor to implement a method for operating an automated system. Additionally and/or alternatively, the non-transitory computer-readable storage medium and the programming instructions may be included in a computer program product.

DETAILED DESCRIPTION

Figure 1:
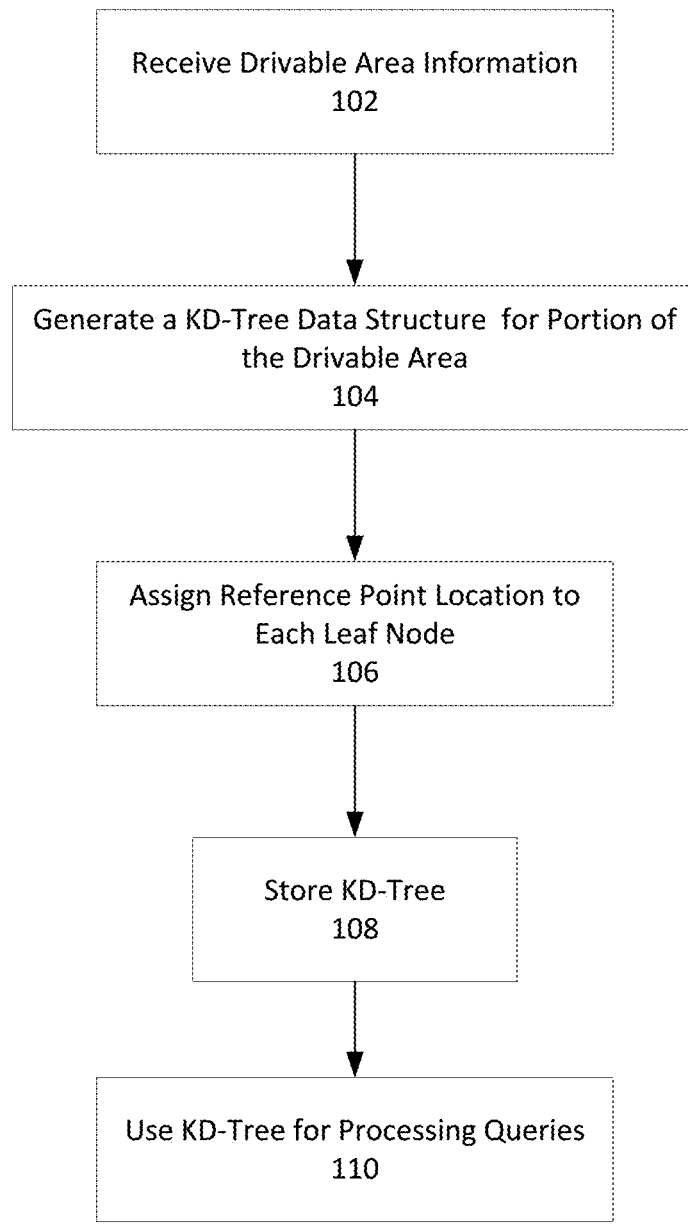
FIG. 1 illustrates a flow chart of an example method of generating a KD-tree for a drivable area portion.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

A "drivable area" is defined as the area where it is possible for a vehicle to drive. A drivable area may, optionally, be represented as a collection of one or more connected polygons (e.g., a 2-dimensional mesh). Information about drivable areas in an environment may be included in, for example, a vector map of the environment in the form of vector data (e.g., points, lines, polygons, etc.).

Spatial query is one of the fundamental operations in navigation of autonomous vehicles. For example, the autonomous vehicle system often needs to determine whether a detected object lies within or intersects with a given region (e.g., the drivable region) or a point (e.g., LiDAR scan data point) lies within a certain region (e.g., point in polygon queries). Typically, the autonomous vehicle first defines a polygon in the coordinate space (e.g., a drivable area polygon), and then determines whether certain spatial objects/points are contained in, or overlap the query polygon. In order to handle spatial queries of different types, the records of all spatial elements need to be checked by geometric computations. As each spatial polygon contains hundreds of points, common computational geometry algorithms are computationally complex to execute. Moreover, the increase in the amount of spatial polygons increases the region query processing time. Therefore, spatial region queries are compute intensive and time consuming, especially with large datasets and/or complex polygons with a large number of sides.

This document describes an automated method for determining or querying information about a point with respect to a drivable area polygon. Examples of such information include whether the point lies inside or outside a drivable area polygon (point in polygon queries), closest point in a given direction, closest point in any direction, or the like. The speed of such spatial region queries is closely related with the data structure employed to organize the polygon data. The current disclosure describes a novel data structure and a reference point determination method that improves the processing time, computational resource requirements, and/or memory requirements for processing such queries. Results of the processed queries may allow an autonomous vehicle to navigate a drivable area. For example, the autonomous vehicle may determine, using the data structure and/or reference points corresponding to the data structure (discussed below), whether a detected object lies within the drivable area the autonomous area is navigating and/or will navigate, and may use the determination to navigate the autonomous vehicle to avoid collision with the object. While the following disclosure describes processing queries related to a drivable area polygon of a map, the disclosure is not so limiting. The principles of this disclosure may similarly be used for processing queries relating to other elements of a map (e.g., crosswalk, lanes, etc.), or applications that need to run queries on geometric data or other types of polygons. The data structure of the current disclosure may also be used for building a data structure corresponding to a "visibility area" for a vehicle, and executing queries against the visibility area without the use of pre-existing map data. Additionally and/or alternatively, the principles of this disclosure may be used for executing rectangular range queries.

Furthermore, there are many other similar use cases where dynamically generated points get compared in real time against static (or slowly changing) polygons for geometric interaction (i.e., those that require point in polygon queries) such as without limitation, providing location based services where it is important to know whether a particular geographic point is inside a particular geographic region; geofencing where it is determined when a mobile device user enters into a defined region for tracking etc.; positioning systems (GPS), computer games, computer vision applications, mapping applications, computer-aided designs (CAD); or the like. The data structure and principles of this disclosure may be used for such application without limitation. For example, it might be useful to determine whether a given user of a device is located inside or outside a given area of interest such as, for example, a city, a park, or the like that may contain hundreds of thousands of points.

Figure 2A:
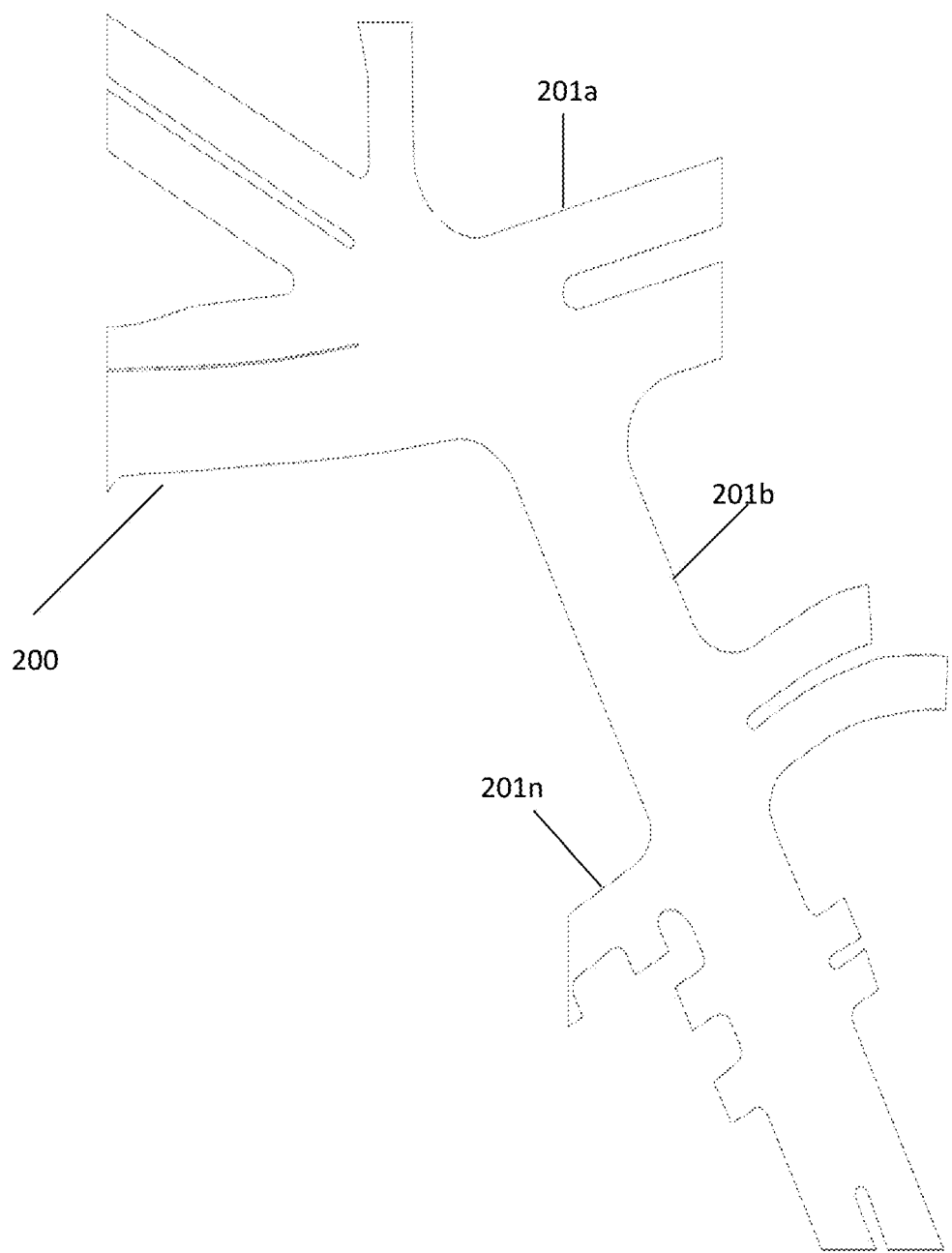
FIG. 2A illustrates an example drivable area including polygons.

FIG. 1 illustrates a flow chart of an example method of creating a spatial data structure from the edges of a drivable area, and using the data structure for processing queries relating to navigation of an autonomous vehicle. As shown in FIG. 1, a system may receive 102 drivable area information (e.g., a map) corresponding to an environment of an autonomous vehicle. The system may receive drivable area information from a data store such as, for example, a map data store. At least a portion of drivable area information may be stored in memory onboard of an autonomous vehicle, may be accessed from a remote electronic device (e.g., a remote server), may be transmitted to an autonomous vehicle via a traffic node positioned in the area in which the vehicle is traveling, may be transmitted to an autonomous vehicle from one or more sensors, and/or the like. In some embodiments, the drivable area map may include one or more closed polygons, each having a plurality of edges. As used in this disclosure, a "polygon" refers to a mapping construct that includes a plurality of edges and is associated with a section of a drivable area. FIG. 2A illustrates example drivable area polygon 200 including a plurality of edges 201a-n.

At 104, the system may generate, for at least a portion of the drivable area (e.g., a portion that is included within a bounding box relevant for an autonomous vehicle navigation), a KD-tree data structure (also referred to as a KD-tree) that partitions the drivable area polygon(s) within the portion of the drivable area into a plurality of regions (leaf nodes), each region including at least some of the edges of the drivable area polygon(s). Such a portion of the drivable area may include at least one polygon, may be determined based on relevancy to the autonomous vehicle navigation, and/or may be included in a bounding box. Optionally, a KD-tree may similarly be generated for a portion of the drivable area that includes more than one polygon (e.g., one or more full polygons and sections of one or more other polygons, two polygons, three polygons, or the like).

A KD-tree is a binary tree (i.e., each node has at most two children) that uses orthogonal hyperplanes to partition a multidimensional (k-dimensional) Euclidean space—in this case a drivable area portion. Typically, in a KD-tree, each node represents a bounded space of "d" dimensions, and each child node represents a subspace of its parent node. In the KD-tree of the current disclosure, each node represents a 2-dimensional space (optionally, including functionality to handle overlap, and each child node represents a subspace of its parent node. The union of all bounded spaces at any tree level represents the whole search space. The KD-tree may be built by starting at the root node of the tree, and selecting a dimension according to a given dimension-selection algorithm for dividing the space into two subspaces such that each subspace has an equal number of one or more geometrical constructs (e.g., polygon edges, surface area, or the like). As a binary tree, each node of a KD-tree has exactly two children. In other words, the KD-tree splits the dataset into two subspaces among a dimension. All data points that have a lower coordinate in the current splitting dimension are assigned to the left sub tree and the rest of data points are stored in the right sub tree. In two dimensions, the splitting dimension is usually alternated between the horizontal and the vertical axes. Two child nodes are then created for the two subspaces and are linked to their parent. The above procedure may be carried out recursively on the subspaces until the number of geometrical construct(s) (e.g., polygon edges, surface area, etc.) in each node at the bottom level of the tree reaches a specified number (bucket size) and/or less than the bucket size (where a leaf has zero edges). The nodes at the bottom level of the tree are called leaf nodes.

Figure 2B:
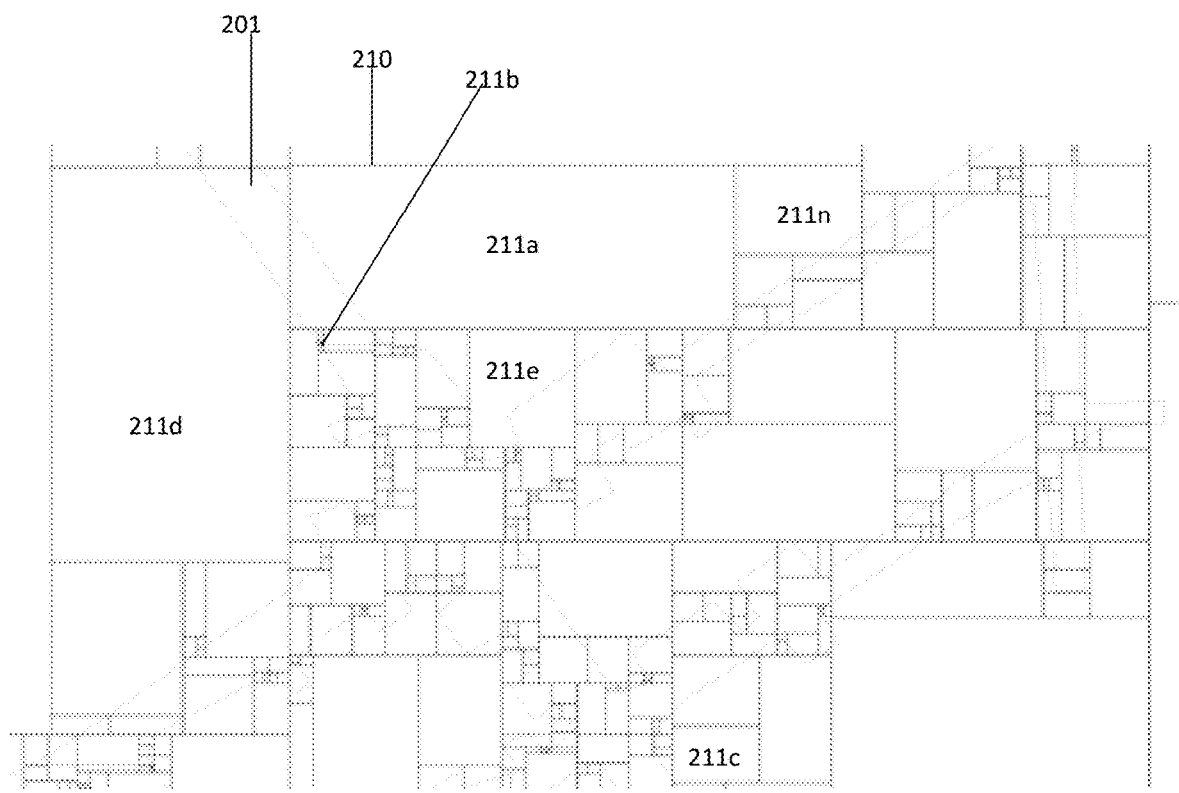
FIG. 2B illustrates an example KD-tree generated for a section of the drivable area shown in FIG. 2A.

In various implementations, the root node may be a polygon (e.g., a rectangle) that completely encompasses drivable area portion for which the KD-tree is generated. The KD-tree of the current disclosure may include two additional types of nodes: leaf nodes which have no children, and partition nodes which divide an area in two parts by an axis-aligned plane and have two children. The partition plane at each level of the tree may be determined such that the number of edges (of polygons of the drivable area) included in each partition node is approximately the same. The system may keep partitioning the partition nodes until a leaf node is identified that includes a threshold number of edges of polygon(s) (e.g., 6 edges, 7 edges, 8 edges, 9 edges, or the like). FIG. 2B illustrates an example two dimensional KD-tree 210 generated for the drivable area 201 shown in FIG. 2A, including leaf nodes 211 a-n that each have a threshold number of edges. For the 2D KD-tree of the current disclosure, the nodes (root node, partition nodes, and leaf nodes) are rectangular in shape.

Figure 2C:
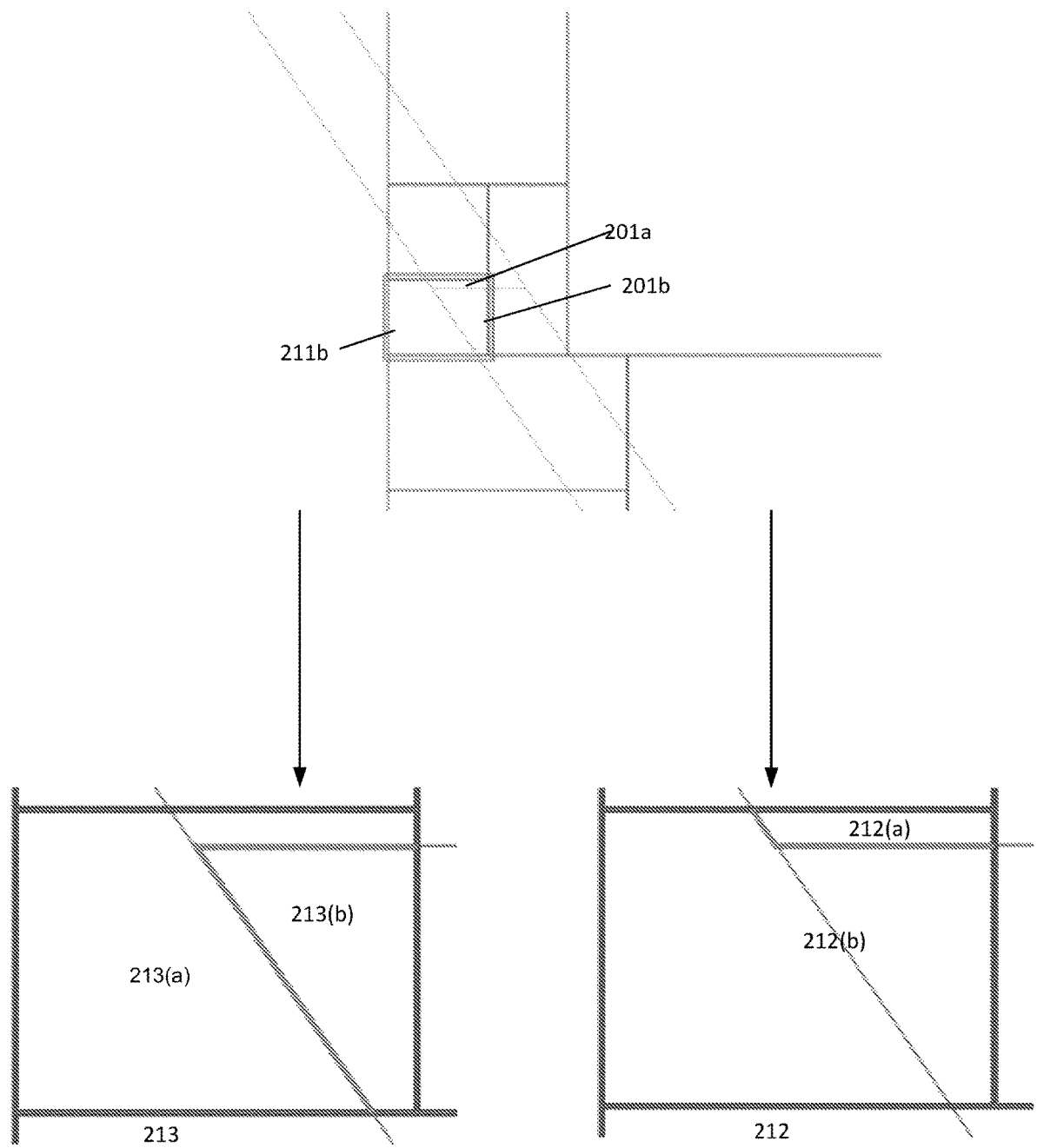
FIG. 2C shows a zoomed in section of the KD-tree of FIG. 2B.

In certain implementations, when the polygons of the drivable portion for which the KD-tree is generated are spatially close to each other and/or overlap, a leaf node may include segments from two or more drivable area polygons. For example, as shown in the enlarged section of the KD-tree 210 (FIG. 2C), the leaf node 211b includes segments from drivable area polygons 201a and 201b. In such scenarios, the system may further identify or generate two sub-leaf nodes from such leaf nodes, each including two segments—one including a drivable area polygon portion and the other not including a drivable area polygon portion. For example, from leaf node 211b, the system may identify sub-leaf nodes 212 (including segments 212(a) and 212(b)), and 213 (including segments 213(a) and 213(b)). Specifically, the generated sub-leaf node 212 includes a first segment formed from the segment of a drivable area polygon (e.g., 201a) and the remaining portion of leaf node 211b, and sub-leaf node 213 includes a second segment of the segment formed from the segment of the other drivable area polygon (e.g., 201b) and the remaining portion of leaf node 211b. Such processing of leaf node 211b allows the system to generate a reference point that includes information relating to the reference point's location with respect to each drivable area polygon segment in the leaf node 211b (described below in more detail). Similarly, leaf nodes having more than two drivable area polygons may be sub-divided into sub-leaf nodes where the number of sub-leaf nodes equal the number of number of drivable area polygons in the leaf node.

Upon generation of the KD-tree, the system may assign a reference point location for each leaf node (106), and identify information corresponding to the reference point (a 2D point inside the leaf node). The information may include whether that reference point is inside or outside the drivable area polygon whose edge(s) are included within that leaf node. This allows the system to determine whether any other point is inside or outside the drivable area polygon (as discussed below).

The reference point location may be any point within the leaf node. The system may make an initial determination that the reference point location is, for example, a center of the rectangular leaf node (or another predefined location within the leaf node), and update the reference point location if the center lies on and/or within a threshold distance of a drivable area polygon portion included within the leaf node. Specifically, while the reference point location for a leaf node can be outside or inside a drivable area polygon portion included within the leaf node, it may not be within a threshold distance (i.e., too close to) and/or on an edge of the drivable area polygon in order to avoid ambiguities relating to whether the reference point lies inside or outside the drivable area polygon. The threshold distance may be determined based on the units/scale of the data within the data structure (e.g., kilometers, meters, etc.) For example, if the data is represented in meters, an acceptable tolerance or threshold may be in the order of about $10^{-5}$.

Figure 3:
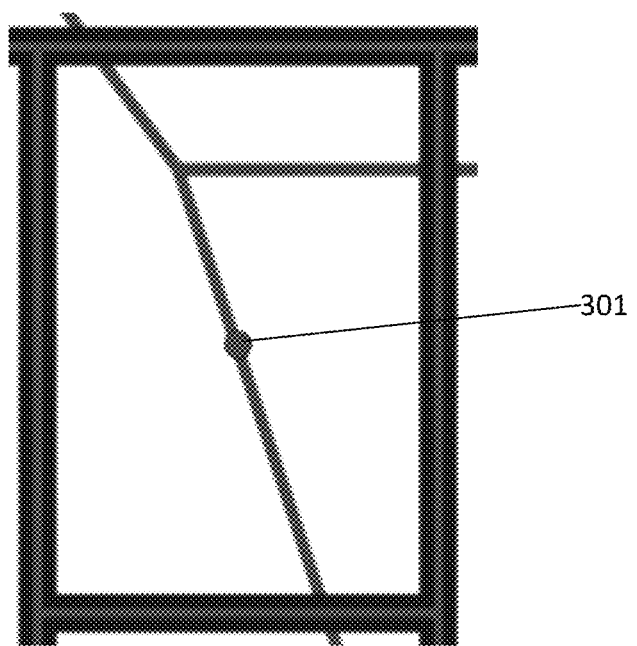
FIG. 3 illustrates an example leaf node that has a reference point location that lies on a drivable area polygon edge.
Figure 4:
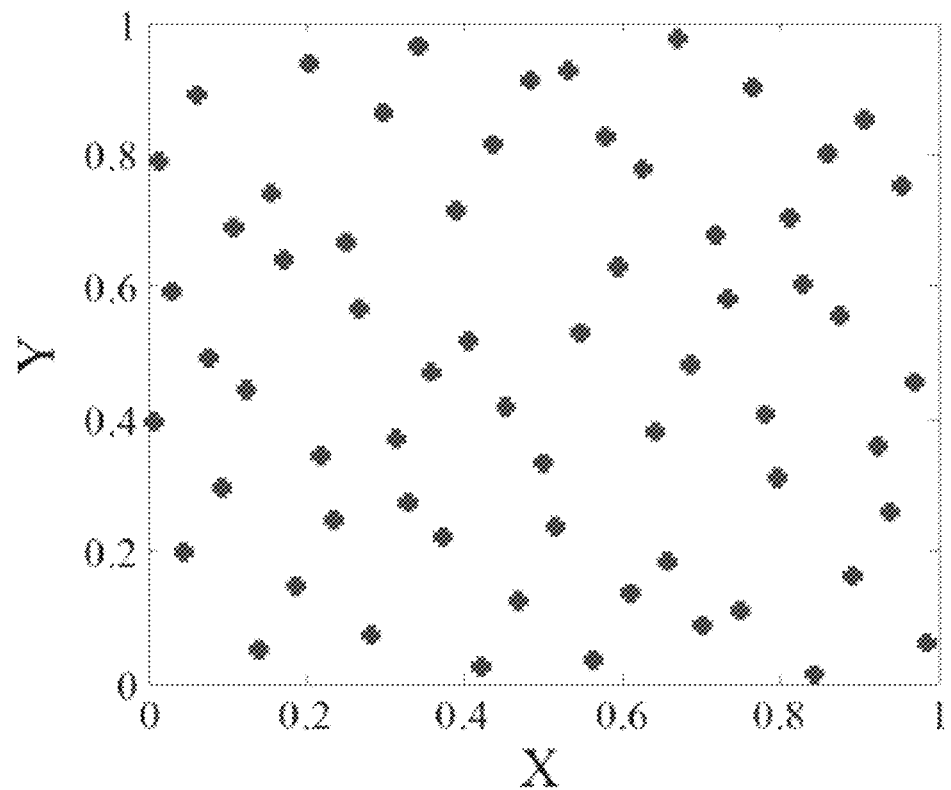
FIG. 4 illustrates an example sampling of points generated using a Halton sequence.

If the initial reference point location (e.g., center of the leaf node) is on a drivable area polygon edge (e.g., reference point location 301 as shown in FIG. 3), the system may assign an updated or alternate reference point location to the leaf node. The system may assign the alternate reference point location by sampling or checking other points in the leaf node in a predetermined sequence until an acceptable reference point location is found (i.e., a reference point that is more than the threshold distance from edges within the leaf node). The predetermined sequence is selected such that it allows the system to quickly and evenly sample many varied point locations within the spatial region occupied by the leaf node to find an acceptable reference point location, while minimizing the number of samples or iterations. An example sequence may be a Halton sequence that is used to generate deterministic 2D points that jump around the leaf node in a quick but orderly fashion. A Halton sequence is a sequence of points within a unit n-cube which have low discrepancy (that is, they appear to be randomly selected but cover the domain uniformly), while being deterministic, fast to compute, and easy to understand and implement. See, for example, J. H. Halton, *Numerische Mathematik*, Vol. 2, pp. 84-90 (1960) and W. H. Press, et al., *Numerical Recipes in Fortran* (2d Edition) page 300 (Cambridge University Press, 1992). An example sampling of points generated using a Halton sequence is shown in FIG. 4. Other sampling methods such as Sobol sequence, Hammersley sequence, Latin Hypercube, or the like, that are low-discrepancy sequences and distribute samples uniformly across the input space are within the scope of this disclosure.

The system may, optionally, store in the KD-tree data structure, an index to an entry into the predetermined sequence (e.g., Halton sequence). The index is selected such that it allows the system to quickly and deterministically regenerate the previously identified acceptable reference point starting at the index, without having to explicitly store the reference point location in the KD-tree. In other words, selection of the index minimizes the memory required for storing the leaf node and corresponding reference point information.

Figure 5:
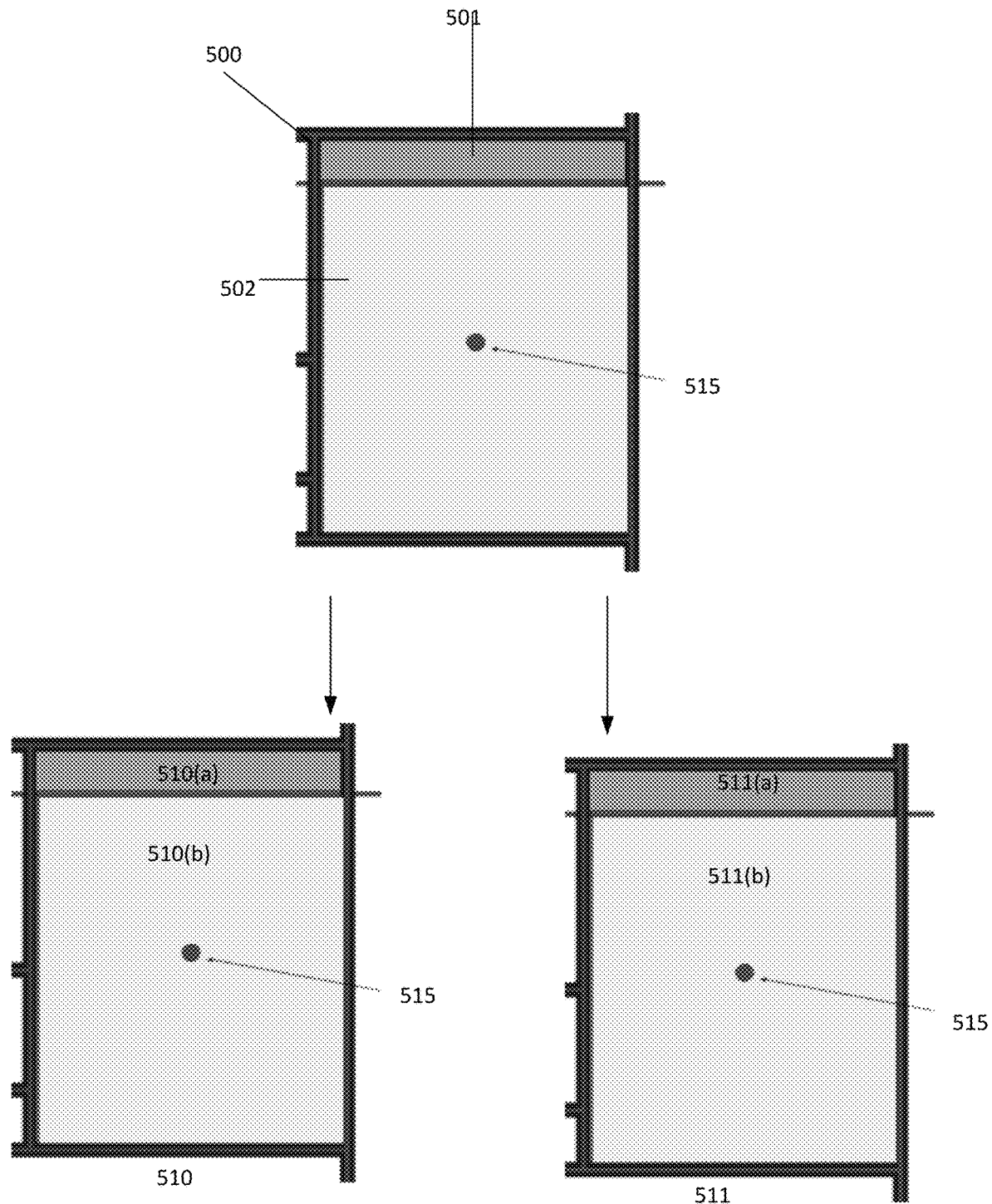
FIG. 5 illustrates an example KD-tree leaf node that includes segments from two polygons and the corresponding sub-leaf nodes.

If sub-leaf nodes are generated from a leaf node (e.g., a leaf node that includes segments from more than one polygon), the reference point for that leaf node and its corresponding location for that leaf node is shared amongst the generated sub-leaf nodes. However, information relating to whether the reference point is inside or outside the drivable area polygon may vary for each sub-leaf node, and is stored as an inside/outside flag for each sub-leaf node in the data structure. For example, the leaf node 500 shown in FIG. 5, the leaf node includes segments from two drivable areas 501 and 502, that generates two sub-leaf nodes 510 (including segments 510*a* and 510*b*, where 510*a* is the drivable area polygon portion) and 511 (including segments 511*a* and 511*b*, where 511*b* is the drivable area polygon portion). While the sub-leaf nodes 510 and 511 share the same reference point location 515, the information relating to whether the reference point 515 is inside or outside the drivable area polygon varies. Specifically, for sub-leaf node 510 where 510*a* is the drivable area polygon portion, a reference point at location 515 lies outside the drivable area polygon, whereas for sub-leaf node 511 where 511*b* is the drivable area polygon portion, a reference point at location 515 lies inside the drivable area polygon.

Typically, a KD-tree node stores a split value to determine where the node gets split or divided. However, since the leaf node is not split any further (unlike partition nodes), the split value in a leaf node may be used to store information relating to the reference point instead at no additional memory cost. The information may include, for example, the sequence index which is shared across all sub-leaf nodes (if the reference point does not lie at the center of the leaf node). Such information (e.g., index) may be stored in other locations of the KD-tree data structure without deviating from the principles of this disclosure.

Using multiple sub-leaf nodes, one per polygon, allows overlapping polygons (e.g., different map levels, overlapping lanes, etc.) to be represented using the same KD-tree, while still allowing the system to process an inside/outside query on each polygon independently and/or together. In other words, use of a single data structure allows for reduction in memory usage while allowing processing of queries in an efficient manner.

Figure 7:
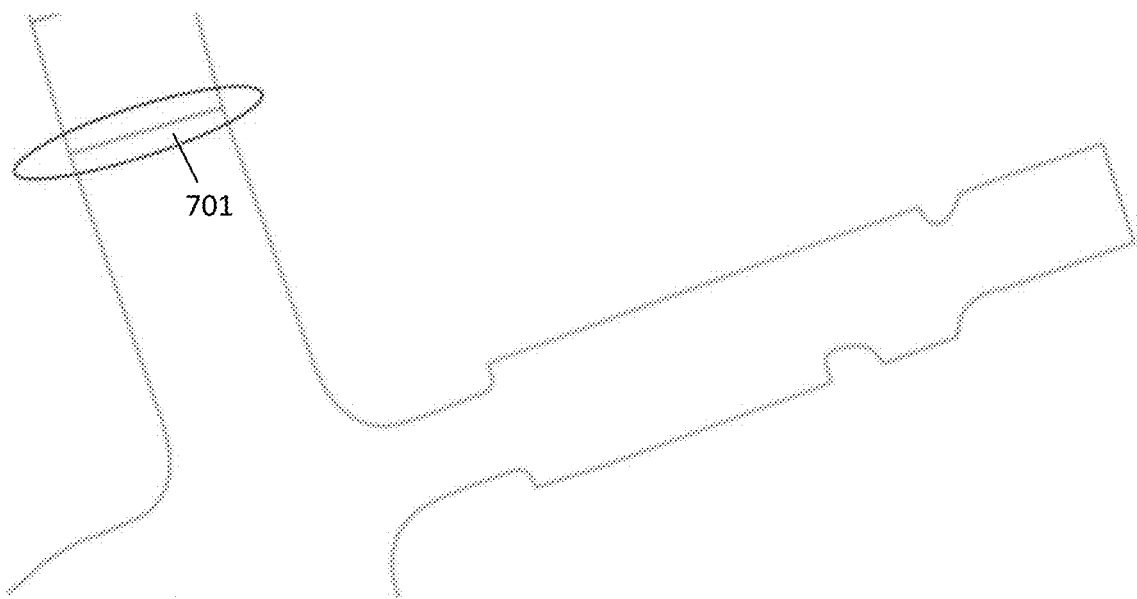
FIG. 7 illustrates an example drivable area polygon edge to be ignored for processing certain queries.

Optionally, the system may mark certain drivable area polygon edges in the KD-tree data structure as edges that need to be ignored while performing certain search queries (e.g., nearest point in a certain direction queries, nearest point queries, etc.). The system may mark such edges using a flag (stored as a single bit) per line segment, indicating whether a given edge is ignorable or not. This allows the system the flexibility of determining, for each query, whether to include results for that edge. For example, the system may ignore edges that don't correspond to physical roadway edges on a map, edges that appear to cut directly across a street (edge 701 shown in FIG. 7), edges that were inserted at the time of map creation while segmenting large polygons into smaller polygons, or the like. Such edges may be ignored in order to avoid receiving search results that lie on edges that do not correspond to an actual roadway edge. The system may not ignore such edges for point-in-polygon queries. This allows the system to answer different types of queries in a single data structure.

At 108, the system may store the KD-tree data structure including the reference point information for the drivable area portion in one or more data stores. The stored KD-tree may be associated with information such as an identifier associated with the drivable area portion, the KD-tree data structure, number of polygons included in the drivable area portion, and/or the like.

Optionally, the system may create a drivable area data object for a drivable area. Such a data object refers to a data representation of the drivable area portion in terms of drivable area portions and corresponding KD-tree(s) generated for the drivable area. For example, a drivable area data object may be a data structure or other data construct. The system may assign a unique identifier to the drivable data object. The unique identifier may be random or pseudo-randomly generated. Alternatively, the unique identifier may be sequentially or otherwise assigned by the system.

The system may add a listing of the KD-trees that form the drivable area to the drivable area data object. The listing may include, for example, an identifier associated with each KD-tree, corresponding drivable area portions, number of drivable area polygons in each portion, and/or the like. For instance, the system may assign a unique identifier to each KD-tree, and may add this unique identifier to the drivable area data object.

In various embodiments, the system may store the drivable area data object in one or more data stores such that it is accessible by one or more systems or subsystems of the autonomous vehicle such as, for example, a prediction system, a perception system, a motion planning system, and/or the like. The system may also add the drivable area data object to one or more maps such as, for example, a road network map, a drivable area map, etc. As such, when the map is loaded, information pertaining to the drivable area data object may be used by the system, as discussed below.

At 110, the system may use the KD-tree(s) to process one or more queries corresponding to a drivable area. The system may use the query results for controlling navigation of an autonomous vehicle with respect to the drivable area. For example, if an object is determined to be inside a drivable area based on the query result, the system may control the autonomous vehicle to avoid collision with the object.

The KD-tree allows for efficient search of point within a polygon type queries for a drivable area. For a point within a polygon query, the system may first find a leaf node which contains the query point by, starting at the query point, traversing the KD-tree to the leaf node(s) that cover the space of the query point. Next, the reference point corresponding to the leaf node may be used to determine whether or not the target point lies within the polygon section included within that leaf node. Specifically, the system may take a line segment that connects the query point and the reference point corresponding to the leaf node, and count the number of edges of a single polygon within the leaf node that such a line segment intersects. If the count is even or zero, the query point is determined to have the same inside/outside status as the reference point with respect to that polygon (i.e., if the reference point is inside the polygon, the query point is also determined to be inside the polygon or vice versa). On the other hand, if the count is odd, the query point is determined to have the opposite status as the reference point with respect to that polygon (i.e., if the reference point is inside the polygon, the query point is determined to be outside the polygon or vice versa). Since each polygon has its own inside/outside status with respect to reference points of leaf nodes, and each leaf node (has segments from a single polygon, we can determine inside/outside status for all polygons independently.

Figure 6:
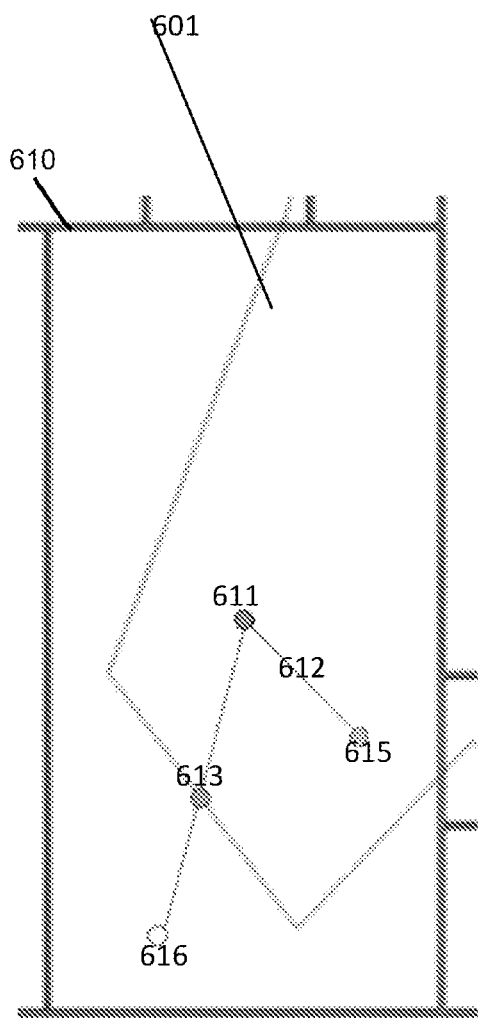
FIG. 6 illustrates an example KD-tree leaf node, and point in polygon queries with respect to the corresponding reference point.

For example, as shown in FIG. 6, there is a single polygon 601 within the leaf node 610, where the leaf node is associated with the reference point 611 that is inside the polygon 601. As illustrated, the line segment 612 between the reference point 611 and the query point 615 does not intersect any polygon edges, and the system may determine that the query point 615 has the same status as the reference point 611 (i.e., it is inside the polygon 601). However, the line segment 613 between the reference point 611 and the query point 616 does intersect one polygon edge, and the system may determine that the query point 616 has the opposite status as the reference point 611 (i.e., it is outside the polygon 601).

As such, the KD-tree and/or the drivable area data object may be used by an autonomous vehicle in a variety of ways. For example, an autonomous vehicle may use the drivable area data object to determine the location of a sensor scan point; location of objects with respect to a drivable area; determine whether a detected pedestrian lies within or outside a drivable area polygon; find the closest point on any edge for a given query point (e.g., for identifying the closest point on curb—i.e., the drivable area boundary—to a pedestrian, the system may find the intersection point in any given direction); for identifying the distance to an edge of the drivable area for identifying exit points and time to exit for a pedestrian (e.g., if a pedestrian is walking in a certain direction, the system may determine the distance to the nearest drivable area edge in that direction and determine potential exit points); find edges of the drivable area that overlap with a given line segment (e.g., given a pedestrian's direction and velocity, the system construct a line segment corresponding to the pedestrian's path and determine whether the pedestrian will eventually exit the drivable area or not depending on the number of overlaps); determine whether an actor (e.g., autonomous vehicle) is "close" or "not close" to a curb by finding the closest point on the drivable area boundary to the actor; find edges that overlap with a given polygon and determine how much of the drivable area falls inside/outside of the polygon (e.g., the polygon may correspond to a vehicle's footprint (or any other object) and the system may determine whether the vehicle lies inside or outside the drivable area, and how much so); or the like.

The KD-tree also allows for efficient search of a nearest neighbor as well as returning all points in the tree within a certain range of a query point. For a nearest neighbor search, the leaf node which contains the target point is first found. Since the nearest neighbor must lie closer than this leaf node, parts of the whole tree do not need to be checked thereby reducing processing time by many orders of magnitude. For example, starting with the root node, the nearest neighbor search algorithm moves down the KD-tree recursively, in the same way that it would if the search point were being inserted (i.e. it goes left or right depending on whether the point is lesser than or greater than the current node in the split dimension). Once the algorithm reaches a leaf node, it checks that node point and if the distance is better, that node point is saved as the "current best". The algorithm unwinds the recursion of the tree, performing the following steps at each node: If the current node is closer than the current best, then it becomes the current best. The algorithm checks whether there could be any points on the other side of the splitting plane that are closer to the search point than the current best. This may be done by intersecting the splitting hyperplane with a hypersphere around the search point that has a radius equal to the current nearest distance. Since the hyperplanes are all axis-aligned this is implemented as a simple comparison to see whether the distance between the splitting coordinate of the search point and current node is lesser than the distance (overall coordinates) from the search point to the current best. If the hypersphere crosses the plane, there could be nearer points on the other side of the plane, so the algorithm must move down the other branch of the tree from the current node looking for closer points, following the same recursive process as the entire search. If the hypersphere doesn't intersect the splitting plane, then the algorithm continues walking up the tree, and the entire branch on the other side of that node is eliminated. When the algorithm finishes this process for the root node, then the search is complete. It should be noted, that the nearest neighbor search may return a single nearest result and/or N nearest neighbors (e.g., 2, 3, 4, etc.) without deviating from the principles of this disclosure (for example, by comparing to a the largest of N results at each step instead of a single current best result).

For example, the KD-tree(s) may be used for efficient search of a closest point in a given direction type queries for a drivable area. Such queries aim to find the point in the tree that is nearest to a given query point in a particular direction. This search can be done efficiently by using the tree properties to quickly eliminate large portions of the search space. For example, the system may use a ray tracing KD-tree traversal algorithm that can efficiently traverse the tree, eliminate large portions of the tree at each traversal step, and perform computationally expensive geometric operations at only small numbers of relevant leaf nodes. In an example embodiment, the ray tracing KD-tree traversal algorithm. See, for example, Foley et al., *KD-Tree Acceleration Structures for a GPU Raytracer*, Graphics Hardware (2005).

For the above example, the computationally expensive task at the leaf node is intersecting the ray (a point and a direction) with each line segment, and determining whether that distance (between the query point and the intersection point) is smaller than any previously determined distance. The data structure of the current disclosure may be used to identify only a small number of leaf nodes for which the task needs to be performed, and the result is the smallest computed intersection distance. Since the KD-tree of this disclosure may include certain leaf nodes that can have multiple polygons, the system may identify one of such multiple polygons that the query intersects with by, for example, selectively including values from different levels. For example, when a drivable area includes an overpass and an underpass, the overpass goes over the underpass in a 3D space representation, while they overlap in a 2D space representation (e.g., the KD-tree of the current disclosure). As such, this will be represented by two sub-leaf nodes (one for the overpass, one for the underpass) in the same 2D space of the KD-tree. For an autonomous vehicle driving on the overpass, typically data and map geometry that deals with the overpass is relevant, while data and map geometry for the underpass can be ignored. The data structure of the current disclosure allows for such filtering of data because for executing a query for the autonomous vehicle traveling on the overpass, the system can traverse the tree down to both sub leaf-nodes, but then ignore the sub-leaf node corresponding to the underpass data (for example, based on a comparison of height data determined from the sensors of the autonomous vehicle and the height information available about a street from map data, the system can determine distance from the drivable area boundary), which would not be relevant at that point in time. Optionally, the system may ignore certain polygon edges for the purpose of such queries by first analyzing a flag value associated with an edge that is indicative of whether an edge needs to be ignored (as discussed above). An autonomous vehicle, may use such queries for, for example, identifying closest points on a drivable area boundary (e.g., a curb) in a given direction (e.g., to identify the goal location of a pedestrian within the drivable area, given the pedestrian's heading), determining when a pedestrian might reach a closest edge (this is a function of the distance determined using the data structure, as well as pedestrian's speed, direction, velocity, etc.). The KD-tree(s) may also be used for efficient search of a closest point in any direction type queries for a drivable area. Such queries aim to find the point in the tree that is nearest to a given query point in any given direction. For example, the system may use a KD-tree traversal algorithm (or any other algorithm) that that can efficiently traverse the tree, eliminate large portions of the tree at each traversal step, and perform computationally expensive geometric operations at only small numbers of relevant leaf nodes. For the above example, the computationally expensive task is determining how close the query point is to any edge in a leaf node by projecting it onto all the line segments in that leaf node, and checking the distance between the query point and that edge. The data structure of the current disclosure may be used to identify only a small number of leaf nodes for which the task needs to be performed, and the result is the smallest computed distance. An autonomous vehicle, may use such queries for, for example, identifying closest points, identifying distance of a pedestrian from a curb, or the like.

Additionally and/or alternatively, the principles of this disclosure may be used for executing rectangular range queries. For example, the system may identify all the curb segments within X meters of the autonomous vehicle by constructing a rectangle centered around the autonomous vehicle with the appropriate side, and run the query to efficiently get all those curb segments from the KD-tree. This may be done by starting from the root of the tree, and at each step, if the query rectangle overlaps either side, recursing down such overlapping side (for example, if the query rectangle overlaps the left rectangle, the system may recurse down that side; then, if the query rectangle overlaps the right side, the system may recurse down that side too, and so on).

It should be noted that the above KD-tree and related systems and methods may be used for applications unrelated to autonomous driving that require efficient searching of large quantities of spatial data. A spatial data record is one type of multidimensional data record. Spatial data records typically describe the attributes (e.g., the position, size, shape, etc.) of geometric objects, such as points, lines, polygons, regions, surfaces, volumes, etc. Spatial records are used in many fields, including computer-aided design, computer graphics, data management systems, robotics, image processing, geographic information systems, pattern recognition, and computational geometry, and the KD-tree of the current disclosure may be used for running queries such as point inclusion queries, nearest neighbor queries, etc. For example, in many location based services applications, it is important to know whether a particular geographic point is inside a particular geographic region. There are many other similar use cases where dynamically generated points get compared in real time against static (or slowly changing) polygons for geometric interaction. Another common application is geofencing, in which it is determined when a mobile device user enters into a defined region, and using that information to send them targeted messages, or for tracking.

Figure 8:
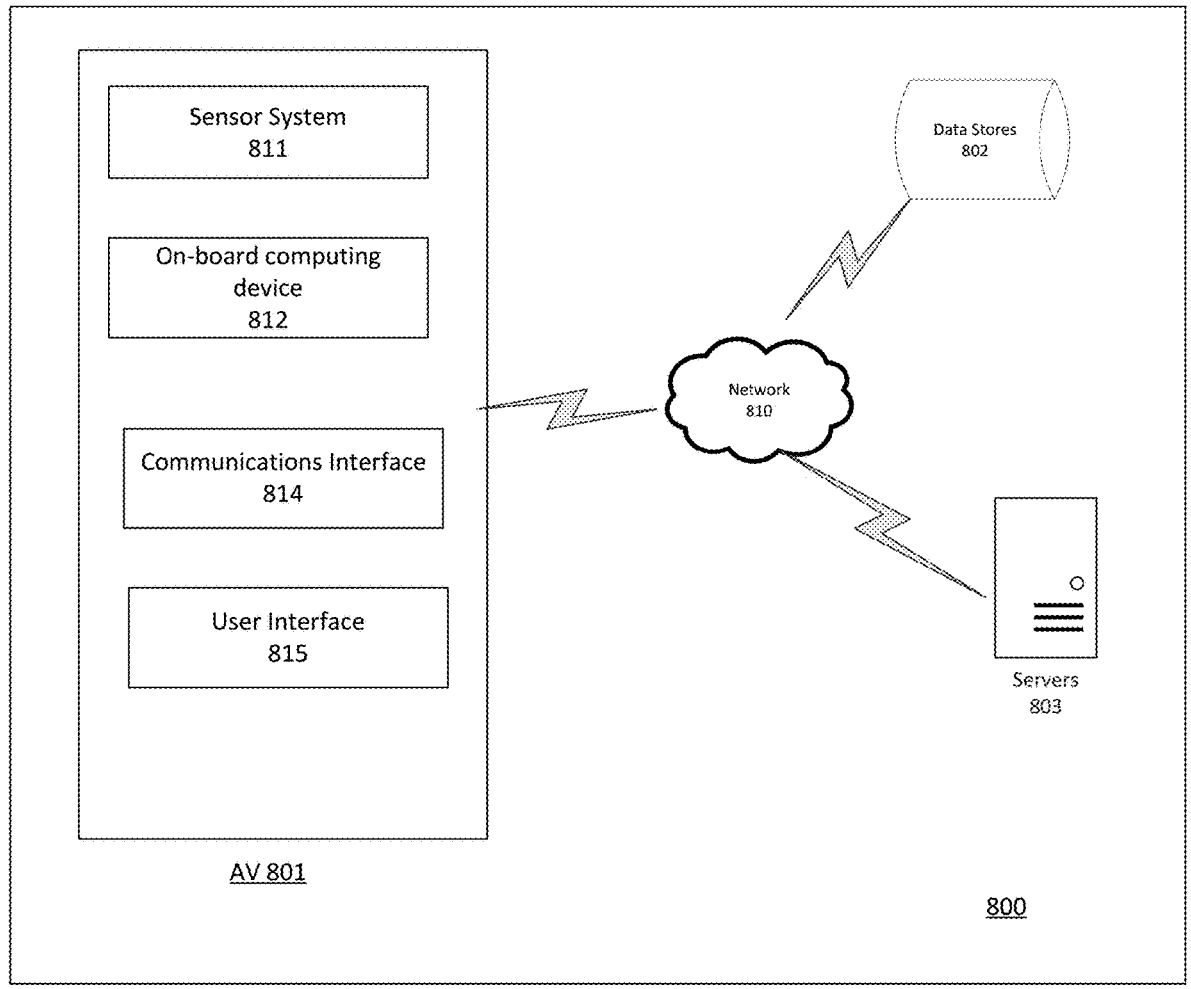
FIG. 8 is a block diagram illustrating an example autonomous vehicle system.

FIG. 8 is a block diagram illustrating an example system 800 that includes an autonomous vehicle 801 in communication with one or more data stores 802 and/or one or more servers 803 via a network 810. Although there is one autonomous vehicle shown, multiple autonomous vehicles may be coupled to each other and/or coupled to data stores 802 and/or servers 803 over network 810. Network 810 may be any type of network such as a local area network (LAN), a wide area network (WAN) such as the Internet, a cellular network, a satellite network, or a combination thereof, and may be wired or wireless. Data store(s) 802 may be any kind of data store such as, without limitation, map data store(s), traffic information data store(s), user information data store(s), point of interest data store(s), or any other type of content data store(s). Server(s) 803 may be any kind of servers or a cluster of servers, such as, without limitation, Web or cloud servers, application servers, backend servers, or a combination thereof.

As illustrated in FIG. 8, the autonomous vehicle 801 may include a sensor system 811, an on-board computing device 812, a communications interface 814, and a user interface 815. Autonomous vehicle 801 may further include certain components (as illustrated, for example, in FIG. 10) included in vehicles, such as, an engine, wheel, steering wheel, transmission, etc., which may be controlled by the on-board computing device 812 using a variety of communication signals and/or commands, such as, for example, acceleration signals or commands, deceleration signals or commands, steering signals or commands, braking signals or commands, etc.

The sensor system 811 may include one or more sensors that are coupled to and/or are included within the autonomous vehicle 801. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 801, information about the environment itself, information about the motion of the autonomous vehicle 801, information about a route of the autonomous vehicle, or the like. As autonomous vehicle 801 travels over a surface, at least some of the sensors may collect data pertaining to the surface.

The LiDAR system may include a sensor configured to sense or detect objects and/or actors in an environment in which the autonomous vehicle 801 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface (s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 801 such as, without limitation, other vehicles (autonomous or driven), robots, satellites, etc.

Figure 9:
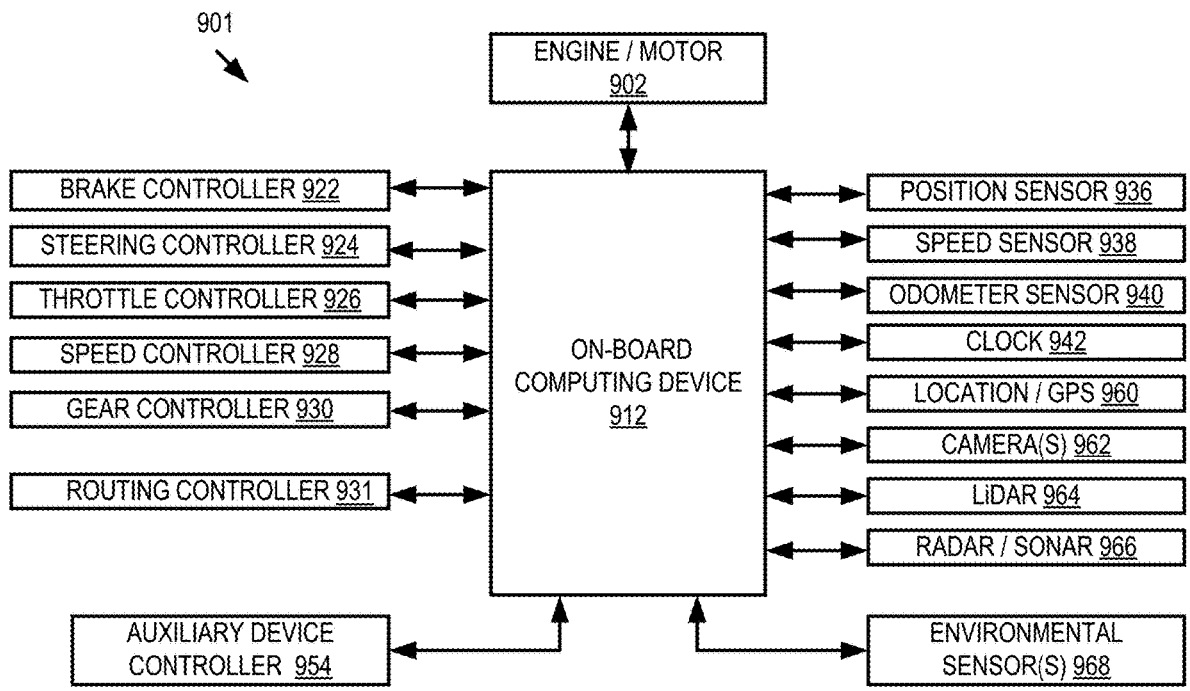
FIG. 9 illustrates an example vehicle controller system.

FIG. 9 illustrates an example system architecture for a vehicle 901, such as the autonomous vehicle 801 of FIG. 1 autonomous vehicle. The vehicle 901 may include an engine or motor 902 and various sensors for measuring various parameters of the vehicle and/or its environment. Operational parameter sensors that are common to both types of vehicles include, for example: a position sensor 936 such as an accelerometer, gyroscope and/or inertial measurement unit; a speed sensor 938; and an odometer sensor 940. The vehicle 901 also may have a clock 942 that the system architecture uses to determine vehicle time during operation. The clock 942 may be encoded into the vehicle on-board computing device 912. It may be a separate device, or multiple clocks may be available.

The vehicle 901 also may include various sensors that operate to gather information about the environment in which the vehicle is traveling. These sensors may include, for example: a location sensor 960 such as a GPS device; object detection sensors such as one or more cameras 962; a LiDAR sensor system 964; and/or a radar and/or a sonar system 966. The sensors also may include environmental sensors 968 such as: (a) a photosensor or other light sensor that can measure intensity of ambient light around the vehicle; (b) a rain sensor such as a sensor that projects infrared light into a windshield at an angle uses a measure of the amount of light that is reflected back to the sensor to measure an amount of precipitation that is on the windshield; and (c) an ambient temperature gauge or other type of temperature sensor. The object detection sensors may enable the vehicle 901 to detect objects that are within a given distance or range of the vehicle 901 in any direction, while the environmental sensors collect data about environmental conditions within the vehicle's area of travel. The system architecture will also include one or more cameras 962 for capturing images of the environment. Any or all of these sensors will capture sensor data that will enable one or more processors of the vehicle's on-board computing device 912 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During operations, information is communicated from the sensors to an on-board computing device 912. The on-board computing device 912 analyzes the data captured by the sensors and optionally controls operations of the vehicle based on results of the analysis. For example, the on-board computing device 912 may control braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers such as an auxiliary device controller 954.

Geographic location information may be communicated from the location sensor 960 to the on-board computing device 912, which may then access a map of the environment that corresponds to the location information to determine known fixed features of the environment such as streets, buildings, stop signs and/or stop/go signals. Captured images from the cameras 962 and/or object detection information captured from sensors such as a LiDAR system 964 is communicated from those sensors to the on-board computing device 912. The object detection information and/or captured images may be processed by the on-board computing device 912 to detect objects in proximity to the vehicle 901. In addition or alternatively, the vehicle 901 may transmit any of the data to a remote server system 803 (FIG. 8) for processing. Any known or to be known technique for making an object detection based on sensor data and/or captured images can be used in the embodiments disclosed in this document.

The on-board computing device 912 may obtain, retrieve, and/or create map data that provides detailed information about the surrounding environment of the autonomous vehicle 901. The on-board computing device 912 may also determine the location, orientation, pose, etc. of the AV in the environment (localization) based on, for example, three dimensional position data (e.g., data from a GPS), three dimensional orientation data, predicted locations, or the like. For example, the on-board computing device 912 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 912 in analyzing the surrounding environment of the autonomous vehicle 901.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 912 may also include and/or may receive information relating to the trip or route of a user, real-time traffic information on the route, or the like.

The on-board computing device 912 may include and/or may be in communication with a routing controller 931 that generates a navigation route from a start position to a destination position for an autonomous vehicle. The routing controller 931 may access a map data store to identify possible routes and road segments that a vehicle can travel on to get from the start position to the destination position. The routing controller 931 may score the possible routes and identify a preferred route to reach the destination. For example, the routing controller 931 may generate a navigation route that minimizes Euclidean distance traveled or other cost function during the route, and may further access the traffic information and/or estimates that can affect an amount of time it will take to travel on a particular route. Depending on implementation, the routing controller 931 may generate one or more routes using various routing methods, such as Dijkstra's algorithm, Bellman-Ford algorithm, or other algorithms. The routing controller 931 may also use the traffic information to generate a navigation route that reflects expected conditions of the route (e.g., current day of the week or current time of day, etc.), such that a route generated for travel during rush-hour may differ from a route generated for travel late at night. The routing controller 931 may also generate more than one navigation route to a destination and send more than one of these navigation routes to a user for selection by the user from among various possible routes.

In various embodiments, an on-board computing device 912 may determine perception information of the surrounding environment of the autonomous vehicle 901. Based on the sensor data provided by one or more sensors and location information that is obtained, the on-board computing device 912 may determine perception information of the surrounding environment of the autonomous vehicle 901. The perception information may represent what an ordinary driver would perceive in the surrounding environment of a vehicle. The perception data may include information relating to one or more objects in the environment of the autonomous vehicle 901. For example, the on-board computing device 912 may process sensor data (e.g., LiDAR or RADAR data, camera images, etc.) in order to identify objects and/or features in the environment of autonomous vehicle 901. The objects may include traffic signals, road way boundaries, other vehicles, pedestrians, and/or obstacles, etc. The on-board computing device 912 may use any now or hereafter known object recognition algorithms, video tracking algorithms, and computer vision algorithms (e.g., track objects frame-to-frame iteratively over a number of time periods) to determine the perception.

In some embodiments, the on-board computing device 912 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 912 may perform one or more prediction and/or forecasting operations. For example, the on-board computing device 912 may predict future locations, trajectories, and/or actions of one or more objects. For example, the on-board computing device 912 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 901, the surrounding environment, and/or their relationship(s). For example, if an object is a vehicle and the current driving environment includes an intersection, the on-board computing device 912 may predict whether the object will likely move straight forward or make a turn. If the perception data indicates that the intersection has no traffic light, the on-board computing device 912 may also predict whether the vehicle may have to fully stop prior to enter the intersection.

In various embodiments, the on-board computing device 912 may determine a motion plan for the autonomous vehicle. For example, the on-board computing device 912 may determine a motion plan for the autonomous vehicle based on the perception data and/or the prediction data. Specifically, given predictions about the future locations of proximate objects and other perception data, the on-board computing device 912 can determine a motion plan for the autonomous vehicle 901 that best navigates the autonomous vehicle relative to the objects at their future locations.

In one or more embodiments, the on-board computing device 912 may receive predictions and make a decision regarding how to handle objects and/or actors in the environment of the autonomous vehicle 901. For example, for a particular actor (e.g., a vehicle with a given speed, direction, turning angle, etc.), the on-board computing device 912 decides whether to overtake, yield, stop, and/or pass based on, for example, traffic conditions, map data, state of the autonomous vehicle, etc. Furthermore, the on-board computing device 912 also plans a path for the autonomous vehicle 901 to travel on a given route, as well as driving parameters (e.g., distance, speed, and/or turning angle). That is, for a given object, the on-board computing device 912 decides what to do with the object and determines how to do it. For example, for a given object, the on-board computing device 912 may decide to pass the object and may determine whether to pass on the left side or right side of the object (including motion parameters such as speed). The on-board computing device 912 may also assess the risk of a collision between a detected object and the autonomous vehicle 901. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 912 may execute one or more control instructions to perform a cautious maneuver (e.g., mildly slow down, accelerate, change lane, or swerve). In contrast, if the collision cannot be avoided, then the on-board computing device 912 may execute one or more control instructions for execution of an emergency maneuver (e.g., brake and/or change direction of travel).

As discussed above, planning and control data regarding the movement of the autonomous vehicle is generated for execution. The on-board computing device 912 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In non-AV embodiments, such as with vehicles that are driven by human operators, one or more functions of the on-board computing device (e.g., determining a motion plan, perception) may be embodied in processor hardware and computer-readable hardware that are part of an electronic devices that is contained with the vehicle, such as an dashboard navigation system or a mobile electronic device of the operator. In such situations, the electronic device may output the trajectories planned by the motion planning system via a display, an audio speaker, or both. In addition, a transceiver of an electronic device that receives certain perception data (such as weather data) from a remote server via wireless communication may be used for determining perception information.

In such embodiments, the vehicle's on-board computing system 912 will be in communication with a remote server (not shown here). The remote server is an external electronic device that is in communication with the vehicle's on-board computing system 912, either via a wireless connection while the vehicle is making a run, or via a wired or wireless connection while the vehicle is parked at a docking facility or service facility. The remote server may receive data that the vehicle collected during its run, such as perception data and operational data. The remote server also may transfer data or other information to the vehicle such as software updates, high definition (HD) map updates, machine learning model updates and other information.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 8, the communications interface 814 may be configured to allow communication between autonomous vehicle 801 and external systems, such as, for example, external devices, sensors, other vehicles, servers, data stores, databases etc. Communications interface 814 may utilize any now or hereafter known protocols, protection schemes, encodings, formats, packaging, etc. such as, without limitation, Wi-Fi, an infrared link, Bluetooth, etc. User interface system 815 may be part of peripheral devices implemented within a vehicle 801 including, for example, a keyboard, a touch screen display device, a microphone, and a speaker, etc.

Figure 10:
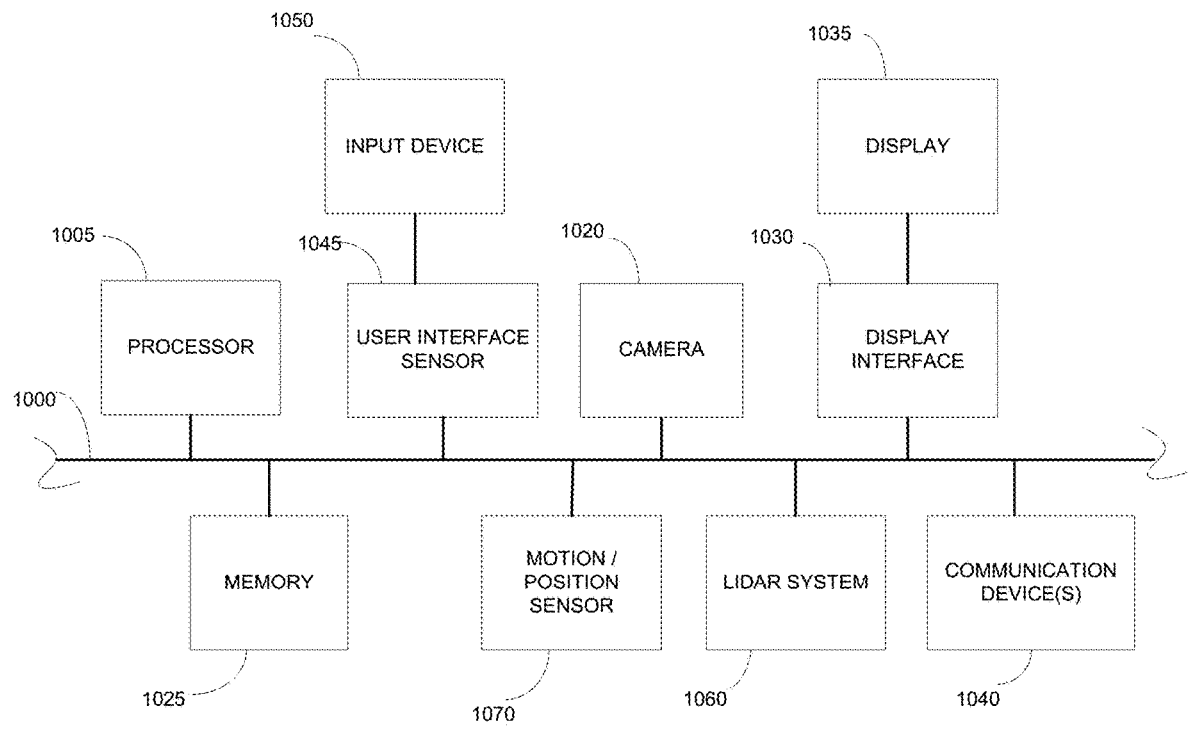
FIG. 10 is a block diagram that illustrates various elements of a possible electronic system, subsystem, controller and/or other component of an AV, and/or external electronic device.

FIG. 10 depicts an example of internal hardware that may be included in any of the electronic components of the system, such as internal processing systems of the AV, external monitoring and reporting systems, or remote servers. An electrical bus 1000 serves as an information highway interconnecting the other illustrated components of the hardware. Processor 1005 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1025. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1030 may permit information from the bus 1000 to be displayed on a display device 1035 in visual, graphic or alphanumeric format, such on an in-dashboard display system of the vehicle. An audio interface and audio output (such as a speaker) also may be provided. Communication with external devices may occur using various communication devices 1040 such as a wireless antenna, a radio frequency identification (RFID) tag and/or short-range or near-field communication transceiver, each of which may optionally communicatively connect with other components of the device via one or more communication system. The communication device(s) 1040 may be configured to be communicatively connected to a communications network, such as the Internet, a local area network or a cellular telephone data network.

The hardware may also include a user interface sensor 1045 that allows for receipt of data from input devices 1050 such as a keyboard or keypad, a joystick, a touchscreen, a touch pad, a remote control, a pointing device and/or microphone. Digital image frames also may be received from a camera 1020 that can capture video and/or still images. The system also may receive data from a motion and/or position sensor 1070 such as an accelerometer, gyroscope or inertial measurement unit. The system also may receive data from a LiDAR system 1060 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object." As used herein, uncertain road users may include pedestrians, cyclists, individuals on roller skates, rollerblades, wheelchairs, individuals, or people in general, etc.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "road network map" refers to a graphical representation of one or more roads. This representation may include information pertaining to lanes, lane segments, lane boundaries, traffic lights, yielding relationships, and/or other traffic or road-related information.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for determining information about an area for controlling navigation of an autonomous vehicle, the method comprising, by a processor:
   defining a bounding box that encloses the area, wherein the area comprises at least one polygon;
   generating, from the bounding box, a KD-tree that partitions the at least one polygon into a plurality of leaf nodes, each of the plurality of leaf nodes comprising at least some of a plurality of edges of the at least one polygon;
   assigning a reference point to each of the plurality of leaf nodes, wherein the reference point is associated with:
      a location within that leaf node, and
      information relating to whether the reference point lies outside or inside the at least one polygon;
   creating a data representation of the area that comprises the KD-tree; and
   adding the data representation to map data comprising the area;
   identifying the location of a query point with respect to the area using the data representation, wherein identifying the location of the query point with respect to the area comprises determining that the query point lies inside the at least one polygon when:
      the reference point lies inside the at least one polygon and a count is even, the count being indicative of a number of edges of the at least one polygon that a line segment that joins the query point and the reference point intersects; or
      the reference point lies outside the at least one polygon and the count is odd; and
   controlling navigation of the autonomous vehicle to traverse the area using the location.

2. The method of claim 1, wherein identifying the location of the query point with respect to the geographical area comprises determining that the query point lies outside the at least one polygon when:
   the reference point lies inside the at least one polygon and the count is odd, the count being indicative of a number of edges of the at least one polygon that a line segment that joins the query point and the reference point intersects; or
   the reference point lies outside the at least one polygon and the count is even.

3. The method of claim 1, wherein the KD-tree further comprises a plurality of partition nodes that divide the bounding box or a previously identified partition node into two regions that each include an equal number of geometrical constructs of the at least one polygon.

4. The method of claim 1, wherein:
   a leaf node of the plurality of leaf nodes comprises segments from two polygons included in the area; and
   the method further comprises generating the KD-tree by generating, corresponding to the leaf node, a first sub-leaf node and a second sub-leaf node, wherein:
      the first sub-leaf node comprises a first segment corresponding to one of the two polygons and a second segment corresponding to a remaining portion of the leaf node,
      the second sub-leaf node comprises a third segment corresponding to the other one of the two polygons and a fourth segment corresponding to a remaining portion of the leaf node, and
      the second sub-leaf node and the first leaf node share a reference point location within the leaf node but differ in information relating to whether that reference point lies outside or inside a polygon.

5. The method of claim 1, wherein assigning the reference point to each of the plurality of leaf nodes comprises assigning the reference point as a point that lies at a geometrical center of each of the plurality of leaf nodes.

6. The method of claim 5, further comprising updating a location of the reference point when the point that lies at the geometrical center of the leaf node lies within a threshold distance of an edge of the at least one polygon.

7. The method of claim 6, wherein updating the location of the reference point comprises: using a Halton sequence for identifying the location; and
   storing an index for regenerating the Halton sequence in a split value location of the leaf node.

8. The method of claim 1, further comprises storing, in the KD-tree, a flag in association with each of the plurality of edges of the at least one polygon, the flag indicative of whether that edge should be ignored while determining the location of the query point with respect to the area.

9. A system for determining information about an area for controlling navigation of an autonomous vehicle, the system comprising:
   a processor; and
   a non-transitory computer-readable medium comprising one or more programming instructions that, when executed by the processor, will cause the processor to:
      define a bounding box that encloses the area, wherein the area comprises at least one polygon;
      generate, from the bounding box, a KD-tree that partitions the at least one polygon into a plurality of leaf nodes, each of the plurality of leaf nodes comprising at least some of a plurality of edges of the at least one polygon;
      assign a reference point to each of the plurality of leaf nodes, wherein the reference point is associated with:
         a location within that leaf node, and
         information relating to whether the reference point lies outside or inside the at least one polygon;
      create a data representation of the area that comprises the KD-tree;
      add the data representation to map data associated with the area:
      identify the location of a query point with respect to the area, wherein the programming instructions that when executed by the processor cause the processor to identify the location of the query point with respect to the area comprise programming instructions to cause the processor to determine that the query point lies inside the at least one polygon when:
         the reference point lies inside the at least one polygon and a count is even, the count being indicative of a number of edges of the at least one polygon that a line segment that joins the query point and the reference point intersects; or the reference point lies outside the at least one polygon and the count is odd; and control navigation of the autonomous vehicle for traversing the area using the location of the query point.

10. The system of claim 9, wherein the programming instructions that when executed by the processor cause the processor to identify the location of the query point with respect to the area comprise programming instructions to cause the processor to determine that the query point lies outside the at least one polygon when:

the reference point lies inside the at least one polygon and the count is odd, the count being indicative of a number of edges of the at least one polygon that a line segment that joins the query point and the reference point intersects; or the reference point lies outside the at least one polygon and the count is even.

11. The system of claim 9, wherein the KD-tree further comprises a plurality of partition nodes that divide the bounding box or a previously identified partition node into two regions that each include an equal number of geometrical constructs of the at least one polygon.

12. The system of claim 9, wherein:

a leaf node of the plurality of leaf nodes comprises segments from two polygons included in the area; and the system further comprises programming instructions that, when executed by the processor, will cause the processor to generate the KD-tree by generating, corresponding to the leaf node, a first sub-leaf node and a second sub-leaf node, wherein:

the first sub-leaf node comprises a first segment corresponding to one of the two polygons and a second segment corresponding to a remaining portion of the leaf node, the second sub-leaf node comprises a third segment corresponding to the other one of the two polygons and a fourth segment corresponding to a remaining portion of the leaf node, and the second sub-leaf node and the first leaf node share a reference point location within the leaf node but differ in information relating to whether that reference point lies outside or inside a polygon.

13. The system of claim 9, wherein the programming instructions that when executed by the processor cause the processor to assign the reference point to each of the plurality of leaf nodes comprise programming instructions that cause the processor to assign the reference point as a point that lies at a geometrical center of each of the plurality of leaf nodes.

14. The system of claim 13, programming instructions that, when executed by the processor, will cause the processor to update a location of the reference point when the point that lies at the geometrical center of the leaf node lies within a threshold distance of an edge of the at least one polygon.

15. The system of claim 14, wherein the programming instructions that when executed by the processor cause the processor to update the location of the reference point comprise programming instructions that cause the processor to:

use a Halton sequence for identifying the location; and store an index for regenerating the Halton sequence in a split value location of the leaf node.

16. A computer program product for determining information about an area for controlling navigation of an autonomous vehicle, the computer program product comprising programming instructions that are configured to cause a processor to:

define a bounding box that encloses the area, wherein the area comprises at least one polygon;

generate, from the bounding box, a KD-tree that partitions the at least one polygon into a plurality of leaf nodes, each of the plurality of leaf nodes comprising at least some of a plurality of edges of the at least one polygon;

assign a reference point to each of the plurality of leaf nodes, wherein the reference point is associated with:

a location within that leaf node, and information relating to whether the reference point lies outside or inside the at least one polygon;

create a data representation of the area that comprises the KD-tree;

add the data representation to map data associated with the area:

identify the location of a query point with respect to the area using the data representation, wherein to identify the location of the query point with respect to the area, the programming instructions are further configured to cause the processor to:

determine that the query point lies inside the at least one polygon when:

the reference point lies inside the at least one polygon and a count is even, the count being indicative of a number of edges of the at least one polygon that a line segment that joins the query point and the reference point intersects; or the reference point lies outside the at least one polygon and the count is odd; or determine that the query point lies outside the at least one polygon when:

the reference point lies inside the at least one polygon and the count is odd, the count being indicative of a number of edges of the at least one polygon that a line segment that joins the query point and the reference point intersects; or the reference point lies outside the at least one polygon and the count is even; and control navigation of the autonomous vehicle for traversing the area using the location of query point.

* * * * *